(12) United States Patent
Messenger et al.

(10) Patent No.: US 6,791,785 B1
(45) Date of Patent: Sep. 14, 2004

(54) DISK DRIVE WITH EFFICIENT COIL TEMPERATURE ESTIMATION

(75) Inventors: Carl R. Messenger, Mission Viejo, CA (US); David D. Nguyen, Fountain Valley, CA (US)

(73) Assignee: Western Digital Technologies, Inc., Lake Forest, CA (US)

( * ) Notice: Subject to any disclaimer, the term of this patent is extended or adjusted under 35 U.S.C. 154(b) by 435 days.

(21) Appl. No.: 09/796,920

(22) Filed: Feb. 28, 2001

(51) Int. Cl.$^7$ ............................. G11B 5/55; G11B 33/14
(52) U.S. Cl. ..................... 360/78.04; 360/78.09; 360/78.07; 360/78.06; 360/97.02; 360/31; 318/634; 318/265; 318/560; 318/561
(58) Field of Search ............................. 360/78.04, 78.09, 360/97.02, 78.06, 78.07, 31; 318/265, 560–561, 634

(56) References Cited

U.S. PATENT DOCUMENTS

| | | | | |
|---|---|---|---|---|
| 5,128,813 A | * | 7/1992 | Lee | 360/78.07 |
| 5,268,804 A | * | 12/1993 | Wallis | 360/78.04 |
| 5,594,603 A | * | 1/1997 | Mori et al. | 360/78.04 |
| 5,793,558 A | * | 8/1998 | Codilian et al. | 360/78.06 |
| 6,369,972 B1 | * | 4/2002 | Codilian et al. | 360/78.04 |

* cited by examiner

*Primary Examiner*—David Hudspeth
*Assistant Examiner*—Natalia Figueroa
(74) *Attorney, Agent, or Firm*—Milad G. Shara, Esq.; Knobbe Martens Olson & Bear; Ramin Mobarhan, Esq.

(57) ABSTRACT

A controller for a disk drive that accesses a look up table having a plurality of thermally characterized values corresponding to a plurality of seek operations. For each seek operation, the corresponding value is added to a register. The controller decrements the register at a rate that is determined using servo interrupts occurring as a result of the rotation of the disk. When the value of the register exceeds a threshold, the controller adjusts the subsequent seek operation so as to inhibit damage to the voice coil as a result of overheating.

47 Claims, 8 Drawing Sheets

DISK DRIVE WITH EFFICIENT COIL TEMPERATURE ESTIMATION

BACKGROUND OF THE INVENTION

1. Field of the Invention

The present invention relates to computer data storage devices and, in particular, relates to a hard disk drive having an actuator coil that is inhibited from overheating and methods for providing the same.

2. Description of the Related Art

Hard disk drive storage devices are an important component in virtually all computer systems. In particular, hard disk drives provide computer systems with the ability to store and retrieve data in a non-volatile manner such that the data is maintained even if power is removed from the device. The popularity of these devices is based on their ability to quickly store and retrieve large quantities of digital information at low cost. However, because the computer industry continually strives to provide computer systems with increased performance, there exists a need for improved disk drives having increased data access speeds.

The typical hard disk drive comprises one or more pivotally mounted disks having a magnetic recording layer disposed thereon and a plurality of magnetic transducer elements for affecting and sensing the magnetization states of the recording layer. The recording layer comprises a large number of relatively small domains disposed thereon that can be independently magnetized according to a localized applied magnetic field and that can be maintained in the magnetized state when the external field is removed. The domains are grouped into concentric circular tracks each having a unique radius on the disk and data is written to or read from each track by positioning the transducer adjacent the disk at the corresponding radius while the disk is rotated at a fixed angular speed.

To position the transducer with respect to the disk, the typical hard disk drive further comprises a pivotally mounted actuator arm for supporting the transducer, a voice coil motor (VCM) for exerting a torque onto the actuator arm, and a servo-controller for controlling the VCM. The VCM comprises a coil of conducting wire wound into a plurality of loops and a permanent magnet disposed adjacent the coil. The servo-controller initiates movement of the actuator arm by directing a control current to flow through the coil which results in the permanent magnet applying a force onto the coil which is then transferred to the actuator arm in the form of a torque. Because the direction of the torque is dictated by the direction of control current flow, the servo-controller is able to reposition the transducer by first directing the control current through the coil so as to angularly accelerate the actuator arm in a first direction and then reversing the control current so as to angularly decelerate the actuator arm.

The time required to reposition the transducer in the foregoing manner is known as the "seek time" of the drive and is an important performance factor that limits the throughput of the drive. For example, a drive having a short seek time will be able to access a requested track of data more quickly than a drive having a longer seek time. According to the state of the art, the seek time required to reposition the transducer across a distance of 2–5 cm is typically in the range of 5–10 ms, thereby resulting in the transducer having a linear acceleration greater than 500 m/s2 or 50 g's. Consequently, to provide such large acceleration, a relatively large current is often required to flow through the coil.

Unfortunately, when large amounts of current are directed through the coil, the rate of heat gain caused by the finite resistance of the windings of the coil may exceed the rate of heat loss to the environment. Thus, if left unchecked for an extended period of time, a rapid succession of seek operations may excessively raise the temperature of the coil such that the drive will no longer be operable. For example, when subjected to an instantaneous or average current that is beyond the VCM's design limitations, the coil may generate excessive heat and deform the coil. Moreover, overmold material may delaminate from the actuator assembly, lose its rigidity and/or outgas particulates into the disk drive enclosure, with deleterious results. Such outgassing from the coil overmold, coil insulators and/or from other materials applied to the coil wires (such as wire lubricants, for example) may occur even at relatively low temperatures (85° C., for example). Thus, to prevent such damage, there is a need to inhibit VCM coil from overheating.

One possible solution to the problem of excessive coil temperature is to blindly limit the VCM control current, i.e. without sensing or estimating the coil temperature, so as to be absolutely sure that the temperature of the coil is less than a threshold value. For example, following a first seek operation, a subsequent seek could be delayed so as to be sure that heat added to the coil during the first seek operation is substantially dissipated to the environment before the subsequent seek occurs. Alternatively, the resistive heat gain in the coil could be reduced by reducing the commanded current through the coil. However, because of the difficulty in estimating how well the environment can remove heat from the coil, the foregoing methods of blindly limiting the coil current will likely require using overly conservative limitations. Thus, while possibly preventing the coil from overheating, the foregoing solution can result in unacceptably slow drive performance.

Another solution is proposed in U.S. Pat. No. 5,594,603 to Mori et al. and assigned to Fujitsu Limited, Japan. In this patent, the current applied to the coil is used to approximate the coil temperature. This method attempts to mathematically model the thermal behavior of the coil by inter-relating a group of factors that includes the VCM control current, the heat naturally radiated by the coil, the ambient temperature, and the thermal capacity of the coil. However, such modeling, although providing an indication of the present VCM temperature, requires considerable processing resources, thereby requiring the drive to include more expensive data processing components.

To reduce costs, the typical disk drive includes only a single processor. Usually, the single processor is required to perform many different functions, such as communicating with a host computer, keeping track of where data is stored on the disk, and controlling the movement of the transducer elements. Thus, the processor is "bandwidth limited" such that the processor is usually busy and, therefore, unable to perform the relatively aforementioned complicated calculations of the prior art.

Another proposed solution is proposed in U.S. Pat. No. 5,128,813 to Lee (hereafter the '813 patent) and assigned to Quantum Corporation. In this patent, a discrete temperature-sensing element is used to dynamically sense the VCM temperature during the operation of the drive. This patent discloses that the thermistor is mounted for thermal conduction directly to the head and disk assembly. While the temperature sensing element may, in fact, provide a direct measurement of the temperature of the VCM (in contrast to the Mori et al. patent above, for example), this method requires mounting a high precision thermistor to the drive and requires that appropriate signal conditioning means be provided to measure, quantize and interpret the resistance of the thermistor. In many aspects, however, disk drive designers and manufacturers operate in an environment that has acquired many of the characteristics of a commodity market. In such a market, the addition of even a single, inexpensive part can directly and adversely affect competitiveness. In this case, therefore, the addition of the thermistor and associated signal conditioning means discussed in the '813 patent may be of little practical value.

From the foregoing, it will be appreciated that there is a need for improved methods of inhibiting a voice coil motor from overheating that are inexpensive in their implantation and do not require substantially increased processing resources.

SUMMARY OF THE INVENTION

The aforementioned needs are satisfied by the hard disk drive and the method of operating a hard disk drive of the present invention. In one aspect, the present invention comprises a method of inhibiting a voice coil of a hard disk drive from overheating, the method comprising performing a plurality of seek operations, and adjusting a value stored in a register by amounts which are indicative of the heat which is produced in the voice coil during the plurality of seek operations. The method further comprises counter-adjusting the values stored in the registers so as to oppose the adjusting, the counter-adjusting occurring at a rate which is determined by a substantially periodic signal. The method also comprises modifying seek operations when the value of the register is outside of the preferred range. In this particular aspect, a register of the control system of the drive can contain a running value which is indicative of the temperature of the drive as this value is being adjusted when seek operations are occurring, i.e., when heat is being added to the drive and this value is also be counter-adjusted at a rate which is based upon the rotational speed of the disk of the drive.

In one particular embodiment, the method further comprises adjusting a value in the register by adding an amount that is selected from a look-up table which is indicative of the heat being added to the coil for a particular seek operation. In one embodiment, the method also comprises counter-adjusting the value by decreasing the value in the register by a selected amount in response to a servo wedge of the disk passing a transducer of the drive. Hence, a value can be simply and efficiently stored in the register that is indicative of the heat that has been added to the drive and this value can also be adjusted downward based upon the elapsed time in which the drive has cooled wherein the elapsed time value is being provided by the periodic detection of servo wedges on the rotating disk.

In another aspect of the invention, the invention comprises a method of inhibiting a voice coil of a hard disk drive from overheating, the method comprising performing a plurality of seek operations so as to reposition a transducer adjacent a recording medium a plurality of times, wherein each seek operation adds heat to the coil. The method further comprises determining a plurality of thermally characterized values wherein each thermally characterized value is indicative of the heat that is added to the coil during a corresponding seek operation of the plurality of seek operations. The method further comprises accumulating the plurality of thermally characterized values in a register and periodically reducing the values stored in the register and modifying seek operations when the value of the register is greater than a threshold value. In this way, a running value can be maintained in a register which is indicative of the temperature of the coil in an efficient manner.

In one particular embodiment, the thermally characterized value is the estimate of the time period that is required for the heat added to the coil during the corresponding seek operation to dissipate away from the coil. In this embodiment, the thermally characterized values comprise a look-up table. In particular implementation of this embodiment, the look-up table is an X-Y look-up table that correlates to an estimated heat dissipating duration (Y) to seek length (X). In one particular implementation, the look-up table defines a positively sloped line that begins at a first point (X1, Y1) and extends to a second point (X2, Y2) and a horizontal line that extends from the second point. In this implementation, X2 is equated with a seek length of maximally heating seek operations such that the transducer is always accelerating and the transducer reaches a maximally allowed speed during the maximally heating seek operation. Moreover, in this particular implementation, Y2 is determined by performing a plurality of maximally heating seek operations on a substantially identical hard disk drive such that a delay period, $\Delta T$ is introduced between successive seek operations so as to maintain the temperature of the substantially identical hard drive at a constant elevated value.

In yet another aspect of the present invention, the present invention comprises a hard disk drive comprising a magnetic medium, a transducer that interacts with a magnetic medium, an actuator comprising a voice coil that accelerates the transducer, and a control system. In this particular aspect, the control system includes a register and the control system instructs the actuator to perform a plurality of seek operations so as to reposition the transducer between a plurality of locations adjacent the magnetic medium. In this aspect, the register stores a value which is indicative of the thermal energy of the coil, and the control system adjusts the value of the register according to the plurality of seek operations so as to account for the heat that is added to the coil during the plurality of seek operations. Moreover, the control system repeatedly counter-adjusts the value of the register so as to account for heat that dissipates away from the coil. The control system further modifies subsequent seek operations when the value stored in the register is outside of a preferred range so as to reduce the rate at which heat is added to the coil.

In these particular aspects of the present invention, a process for determining and estimating the heat in a coil so as to inhibit damage to the coil as a result of successive seek operations can be performed efficiently. More particularly, the use of a register that is adjusted up and down based upon predetermined values allows for a more efficient and simply implemented process of estimating the heat within a coil which further allows the coil to be operated closer to the damage threshold of the coil. These and other objects and advantages of the present invention will become more apparent from the following description taken in conjunction with the accompanying drawings.

DETAILED DESCRIPTION OF THE PREFERRED EMBODIMENT

Figure 1:
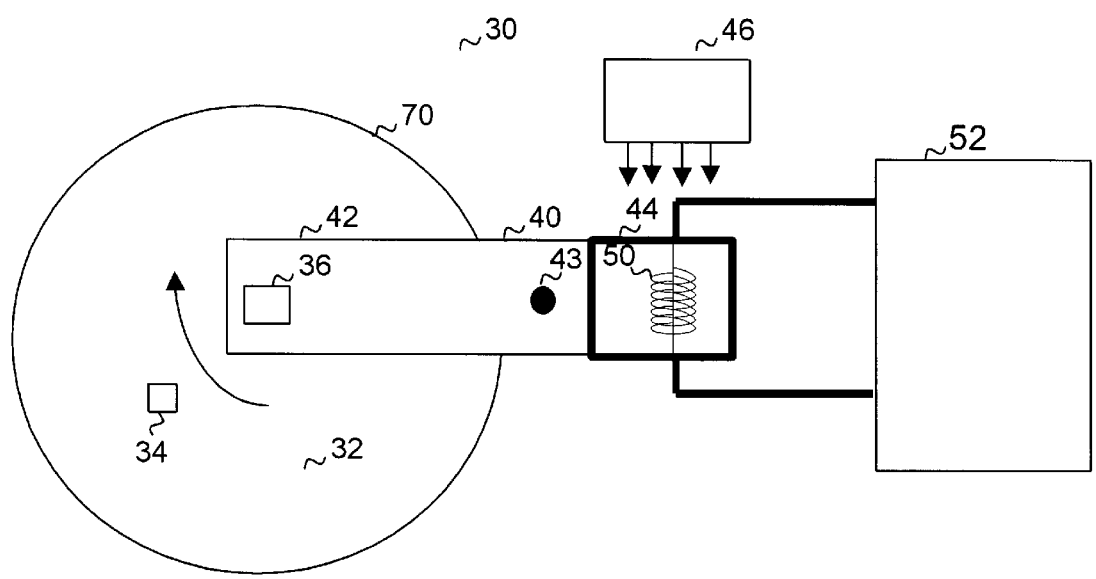
FIG. 1 is a schematic diagram illustrating a hard disk drive according to one aspect of the present invention.

Reference will now be made to the drawings wherein like numerals refer to like parts throughout. FIG. 1 schematically illustrates a hard disk drive 30 for storing information according to one aspect of the present invention. The hard disk drive comprises a magnetic medium 32 having a plurality of magnetic domains 34 disposed therein such that the magnetization states of the domains 34 define the information stored on the hard disk drive 30. The medium 32 is preferably disposed on one or more disk-shaped members 70. The drive 30 further comprises a transducer 36 for affecting and sensing the magnetization states of the magnetic domains 34 and an actuator 40 for disposing the transducer 36 adjacent the magnetic medium 32 and for moving the transducer 36 between positions adjacent the medium 32.

The actuator 40 comprises a pivotally mounted actuator arm 42 coupled to the transducer 36, an actuator coil 44 coupled to the actuator arm 42, and a magnetic field source 46, such as a permanent magnet, for exerting forces onto the coil 44 when current flows through the coil 44. The arm 42 is able to pivot about a pivot point 43 in a plane parallel to a recording surface of the magnetic medium 32 such that the arm 42 is able to sweep across a substantial portion of the recording surface. The coil 44 comprises a conducting wire wound into a plurality of loops and, thus, defines a conducting path 50 such that a current flowing through the conducting path 50 interacts with the magnetic field of the magnetic source 46 to exert forces onto the coil 44. Consequently, the actuator arm 42 experiences a net torque in response to the current flowing through the coil 44 which angularly accelerates the actuator arm 42 causing the arm 42 to pivot about the pivot point 43 and, thus, linearly accelerates the transducer 36 from an initial state of rest into a state of motion with respect to the field source 46. Furthermore, in response to the coil current flowing in the opposite direction, the actuator arm 42 experiences a torque that subsequently brings the transducer 36 to a state of rest at a new position with respect the medium 32.

Figure 2:
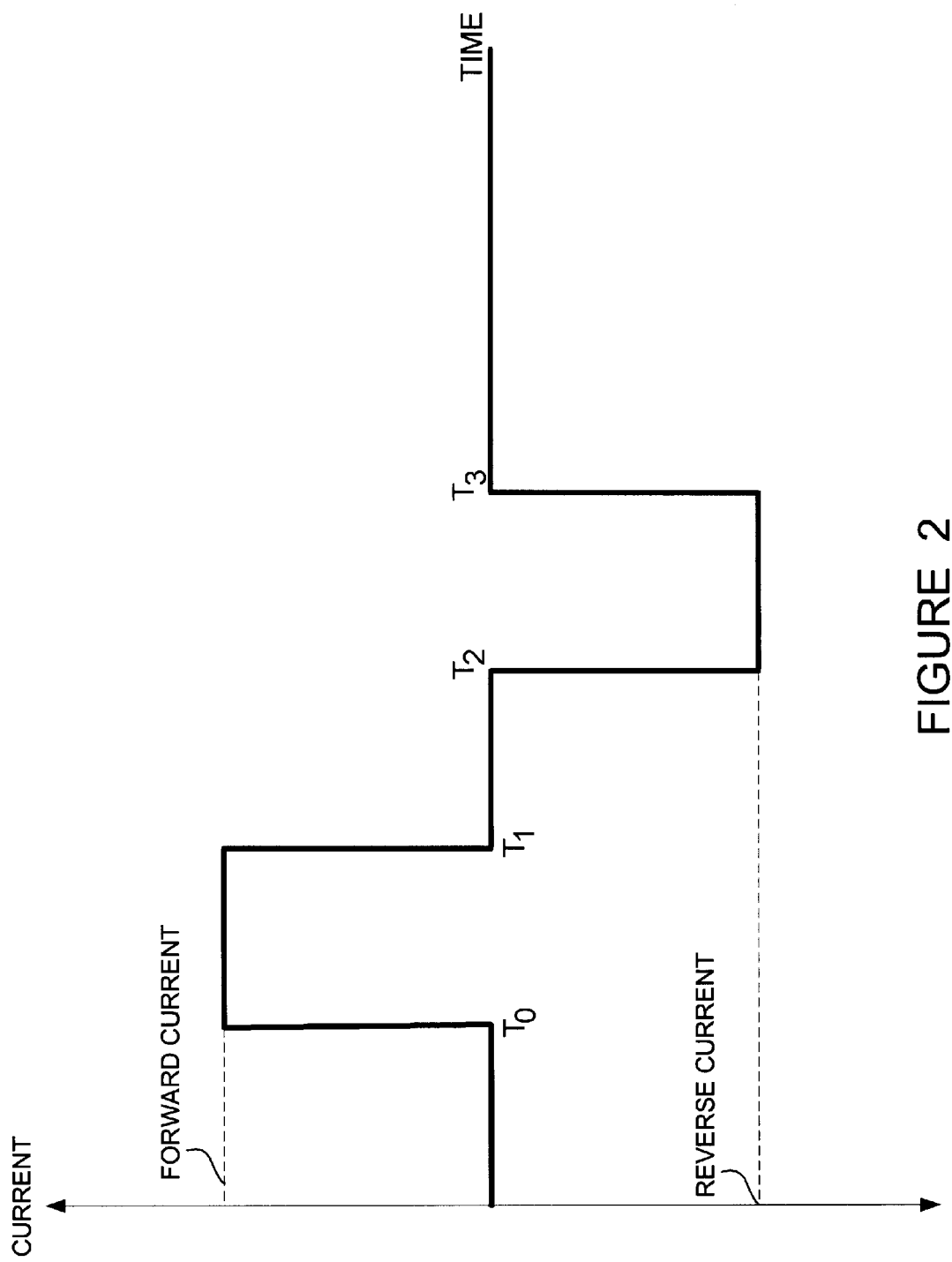
FIG. 2 is a diagram illustrating a typical current consumption curve of a voice coil motor as it performs a typical seek operation.

For example, the simplified current profile illustrated in FIG. 2 could be used to perform a seek operation so as to pivot the actuator arm 42 between first and second orientations. In particular, a forward current is driven through the coil 44 starting at $t_0$ and ending at $t_1$. During this period, the forward current angularly accelerates the actuator arm 42 at a rate which is proportional to the amplitude of the forward current until the time $t_1$, such that the actuator arm 42 reaches a maximum angular speed. During a time period $t_1$, to $t_2$, the current to the coil 44 is disabled and the actuator arm is coasting at a generally constant angular velocity towards it second orientation. This period is typically referred to as a dwell period. Starting at a time $t_2$, a reverse current is driven through the coil 44 so as to decelerate the actuator arm 42 at a rate which is proportional to the amplitude of the reverse current until the reverse current is switched off at a time $t_3$ such that the actuator arm 42 is at rest and the transducer 36 is positioned substantially near a desired final position.

Thus, because the time required to perform the seek operation is simply equal to $t_3-t_0$, decreasing this time difference by increasing the magnitudes of the forward and reverse currents will result in a reduced seek time and, therefore, faster access to data stored on the drive 30. However, as mentioned above, increasing the current flowing the coil 44 increases the rate at which heat is generated therein, thereby increasing the likelihood that the temperature of the coil 44 will be elevated to a damaging level. However, as will be described in greater detail below, the drive 30 includes an inexpensive yet effective system and process for monitoring the temperature of the coil 44 so that the drive 30 can achieve high throughput rates when the temperature of the coil 44 is within an acceptable range and so that the rate of heat generation within the coil 44 can be limited when the temperature of the coil 44 is approaching the upper bounds of the acceptable range.

As shown in FIG. 1, the hard disk drive 30 further comprises a control system 52 for controlling the current that flows through the coil 44. When a request is received by the drive 30 that requires repositioning the transducer 36 to a different position, the control system determines a desired current profile, such as that shown in FIG. 2, and directs current with the desired profile to flow through the coil 44 using techniques that are well known in the art during a normal mode of operation. However, the control system 52 includes a feature not found in the prior art that allows the control system 52 to estimate and monitor the temperature of the coil 44. Thus, when the temperature of the coil is determined to be outside of the acceptable temperature range, the control system 52 can assume an alarmed state whereby the control system 52 attempts to limit the current flowing through the coil so as to reduce the average rate of heat generated within the coil.

Figure 3:
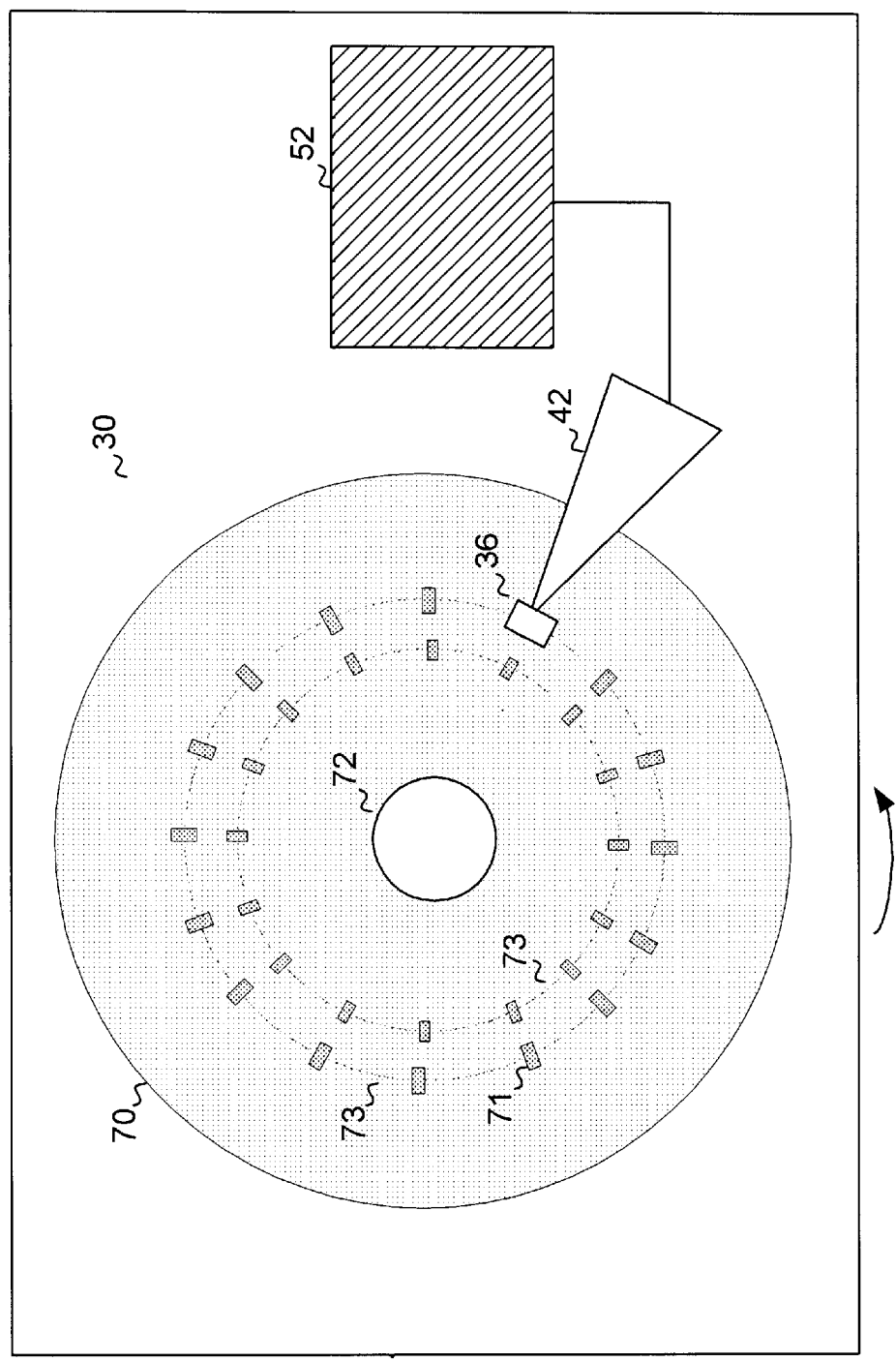
FIG. 3 is a schematic illustration of a typical disk of the hard disk drive of FIG. 1.

FIG. 3 is schematic illustration of a typical disk 70 of the hard disk drive 30 that has a plurality of servo wedges 71 formed thereon. As is understood in the art, the disk 70 is mounted on a spindle 72 such that the disk 70 is rotated by the spindle 72 at a relatively high RPM, e.g. in some implementations at 7200 RPM. The servo wedges 71 define a servo track 73 which is used by a control system implementing a servo-controller function to monitor the present location of the transducer 36 with respect to the magnetic media 32 formed on the surface 30 of the disk 70. In one typical implementation, there are a total of 64 servo wedges in a servo track.

The transducer 36 generates a servo-wedge interrupt at the control system 52 each time a servo wedge 71 is detected. In this way, the control system 52 is continually provided information about the present location of the transducer 36 with respect to the disk 70 and can use this information in a known manner to adjust the positioning of the actuator arm 42 to ensure that the transducer 36 is correctly positioned during track following and seeking. As will be described in greater detail below in reference to FIG. 4, the control system 52 is receiving a servo wedge interrupt at a relatively high frequency, e.g., for a disk having 64 servo wedges per servo track and rotating at 7200 RPM, the frequency of the control system receiving a servo interrupt will be on the order of 7.6 kHz.

Figure 4:
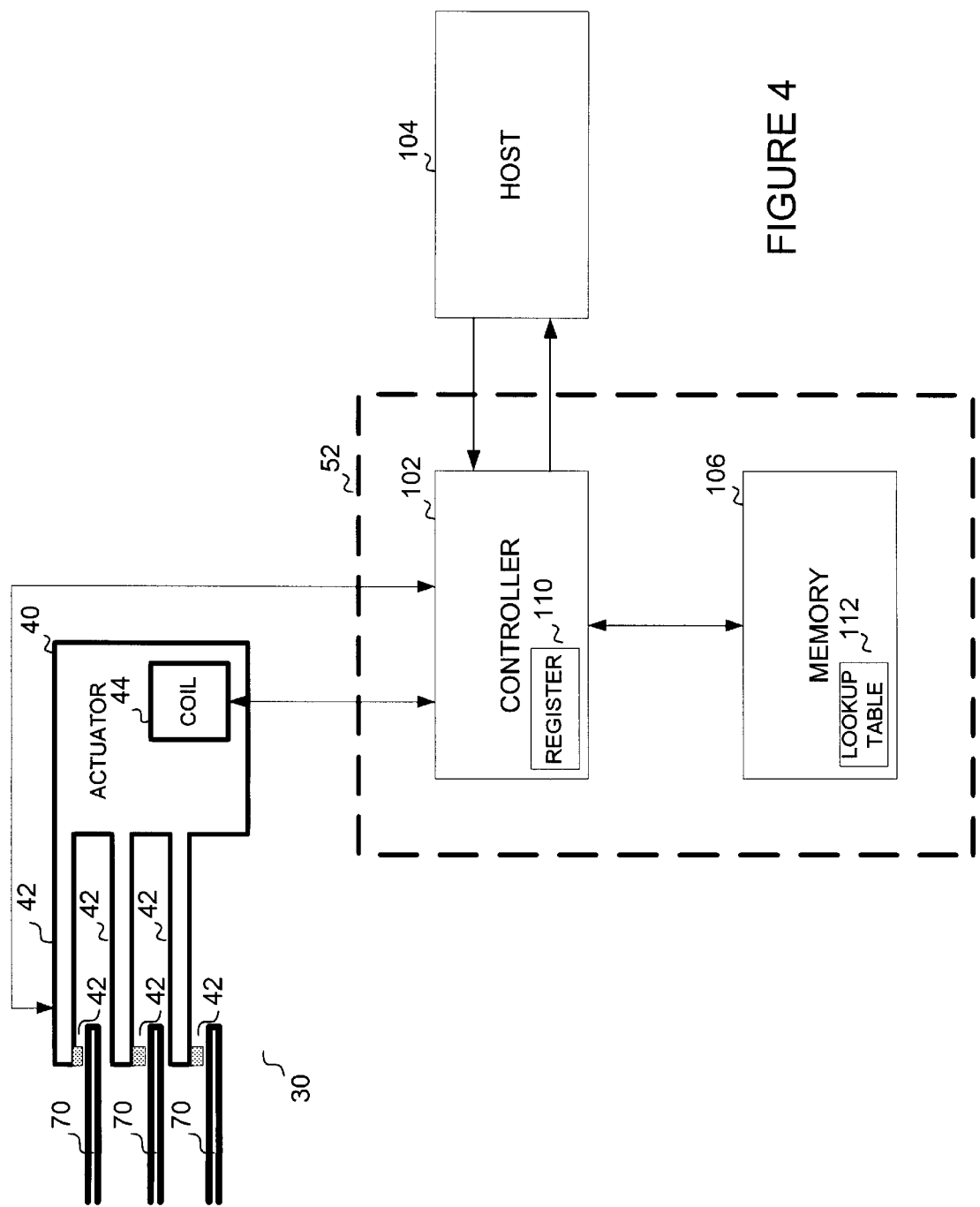
FIG. 4 is a schematic functional block diagram illustrating the functional components of the hard disk drive of FIG. 1.

FIG. 4 is a simplified functional block diagram illustrating the control system 52 and its interrelation between the actuator 40 that moves the actuator arms 42 so as to be able to access particular locations on the magnetic media 32 and the interrelation between the actuator control 52 and a host 104. As is illustrated in FIG. 4, the hard disk 30 typically includes the plurality of disks 70 with an actuator 40 and a plurality of actuator arms 42. The control system 52 is thus adapted to individually control each of the actuator 40 and actuator arms 42 in the manner described in greater detail below.

In particular, the control system 52 is logically organized to include a controller 102 that includes the functionality of a well known servo controller which controls the positioning of each actuator arm 42 and the transducer 36 over the magnetic media 32 in order to read or write data from particular locations on the magnetic media 32. The controller 102 receives the servo wedge interrupts from the transducer 36 and uses these interrupts to control the positioning of the transducer 36 with respect to the magnetic media 32 of the disk 70 in a known manner. The controller 102 also receives signals from the host 104 that induces the controller 102 to send signals to the voice coil 44 and the actuator 44 so as to induce the movement of the actuator arm 42 to reposition the transducer 36 with respect to the disk 70 during a seek operation in a known manner.

The controller 102 also includes the functionality to be able to either retrieve or send data between the magnetic media 32 and a host system 104. In this aspect, the controller 102 may include preamplifiers which amply signals from the transducers 36, a read/write channel that encodes and decodes data either read from or written to the magnetic media 32 of the disk 70, a disk controller which formats and provides error detection for the correction of disk data, and an interface controller with an associated interface that allows for interconnection and transfer of data between the host 104 and the magnetic media 32. The exact implementation of the manner in which data is transferred between the magnetic media 32 and the host 104 can be performed in any of a number of known implementations without departing from the spirit of the present invention.

In this embodiment, a single controller 102 is adapted to have the functionality of both a known servo controller and a disk controller. In some disk drive implementations, there are two separate controllers. In other implementations, one controller provides the functionality of both the servo controller and the disk controller. It will be appreciated from the following discussion that the process for efficiently determining the amount of excess heat within the voice coil 44 and accordingly adjusting the seek operation of the disk drive can be implemented in any of a number of different types and configurations of controllers without departing from the spirit of the present invention.

As is mentioned in the background section of this paper, the current flowing through the VCM coil 44 adds heat to the coil 44 which, if unregulated, can potentially raise the temperature of the coil 44 to damaging levels. To reduce the likelihood of such an occurrence, the control system 52 and, in particular, the controller 102, estimates the temperature of the coil 44 in a manner that will be described in greater detail below in connection with FIG. 5 and thereby alters the operation of the coil 44 so as to reduce the likelihood of damage to the coil 44 as a result of repeated seek operations.

In particular, the controller 102 includes a register 110 that contains a value that is indicative of the temperature or thermal energy of the coil 44 based upon the preceding operation of the coil 44. Moreover, the controller 102 can access a look-up table 112 in the memory 106 so as to determine values that correspond to or approximate the heat which would be added to the coil 44 for a particular seek operation. The controller 102 is periodically instructed by the host 104 to maneuver the arm 42 so as to position the transducer 36 at a different location adjacent the disk 70. This operation corresponds to the seek operation described above in connection with FIGS. 1 and 2. The transducer 36 will thus have to move a specific seek length from its original position to its new position adjacent the desired location on the magnetic media 32 of the disk 70. As described above in reference to FIG. 2, each such repositioning or seek results in current running through the coil 44 so as to accelerate the actuator arm 42 to a given angular velocity to thereby rotate the actuator arm 42 and then additional current is provided to the coil 44 so as to decelerate the actuator to thereby cause the actuator to stop at the desired orientation with respect to the disk 70. Thus, to move the transducer 36 a given distance, i.e., a seek length, a certain amount of current must be provided to the coil 44. As discussed above, it is the providing of this current that results in heat building up in the coil 44.

As will be discussed in greater detail below in reference to FIGS. 5 and 7, the look-up table 112 includes thermally characterized values that correspond to different magnitudes of seek lengths. Hence, when the controller 102 interprets a command from the host 104 requiring that an actuator arm 42 be moved a particular seek length to perform a requested read or write operation, the controller 102 retrieves the thermally characterized value corresponding to the particular seek length from the look-up table 112 and adds this value to the register 110. As successive seeks are performed, this value in the register 110 is further augmented by the thermally characterized values for the subsequent seeks. In this way, a running tally of the amount of heat energy that is being added to the coil 44 by successive seek operations can be maintained in the register 110.

However, the heat that is being added to the coil 44 is dissipating off of the coil 44 at a generally constant rate. Consequently, the controller 102 is further configured to counter-adjust the value in the register 110 to account for this heat that dissipates away from the coil 44. In one particular implementation, the controller 102 is continuously receiving servo interrupts from the transducer 36 as the transducer 36 passes dedicated servo wedges 71 on the disk 70. As discussed above, the servo wedges 71 are circumferentially spaced around the disk 70 at constant intervals. Moreover, the disk 70 is rotated at a constant velocity such that the controller 102 is receiving a substantially constant periodic signal from the transducer 36 indicative of the transducer detecting a servo wedge 71.

As discussed above, the controller 102 is interpreting this generally constant periodic signal from the transducer 36 for purposes of maintaining the correct position of the transducer 36 during track following and seek operations in a known manner. However, since the controller 102 is receiving this signal already, the controller 102 can also use this signal for efficiently approximating the dissipation of heat from the coil 44 over time. In particular, the controller 102 can use this signal as a timing signal to decrement the value in the register 110 at a rate that is selected to approximate or otherwise correspond to the rate at which heat energy will dissipate out of the coil 44 over time.

In this way, the register 110 maintains a running value in the register 110 that is indicative of the amount of heat that is being added to the coil as a result of successive seek operations less the amount of heat that has dissipated off of the coil. This running total can then be used to determine whether a subsequent seek operation will result in the value in the register 110 exceeding a predetermined threshold for the coil 44. In one embodiment, the threshold is a heat value that is empirically determined by successive applications of seek operations to a coil 44 that will result in the coil 44 being damaged. If the controller 102 determines that the value in the register 110 exceeds the threshold, the controller 102 can then adjust the subsequent seek operation such that the likelihood of damage to the coil is reduced. For example, the controller 102 can delay the seek operation for a time period such that the successive decrementing of the register 110 as a result of sensing of the servo wedges 71 results in the value in the register 110 dropping below the threshold. Alternatively, the controller 102 can modify the seek profile such that less current is injected into the coil 44 resulting in less heat being applied to the coil 44.

Figure 5:
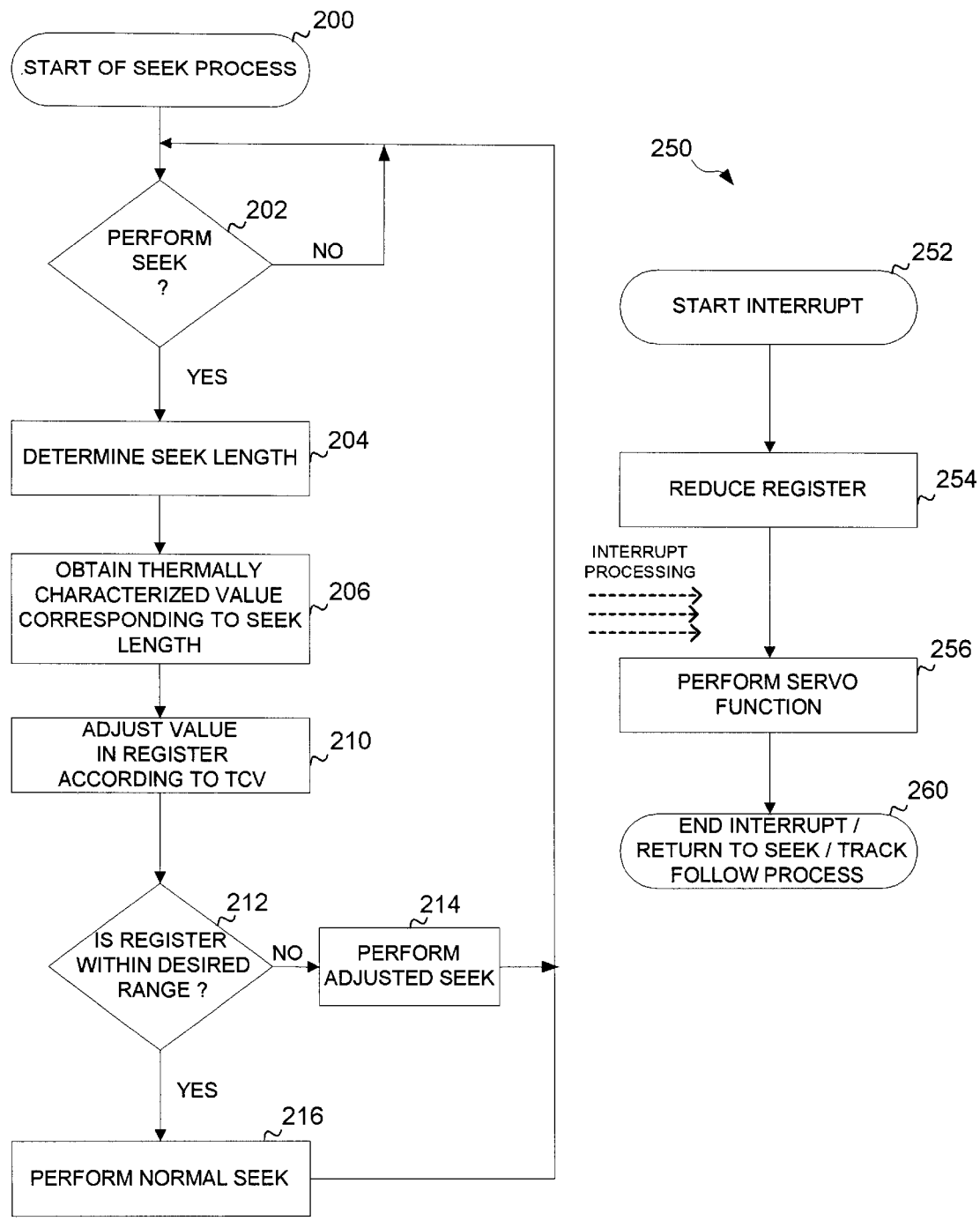
FIG. 5 is a flow chart illustrating the operation of the hard disk drive of FIG. 1 as it implements a process for efficiently estimating the heat within the voice coil and for adjusting seek operation to ensure that the heat energy within the voice coil does not exceed a predetermined maximum value.

FIG. 5 is an exemplary flow chart which illustrates the operation of the controller 102 as it performs this process. As is illustrated in FIG. 5, from a start state 200, the controller 102 determines, in decision state 202, whether it is to perform a seek. As is understood in the art, the controller 102 receives signals from the host 104 where the host 104 is requesting information be read from or written to the disk 70. Upon determining, in decision state 202, that a seek is necessary as a result of a command by the host 104 to initiate a read or write operation, the controller 102 then determines, in state 204, the seek length. As discussed above in reference to FIG. 2, the seek length corresponds to the length of travel that the transducer 36 will have to travel over the disk 70 so as to be correctly positioned adjacent the appropriate location of the disk 70. As is understood, the controller 102, in its servo controller implementation, is initially already aware of the current location of the transducer with respect to the disk 70 as a result of the servo wedge interrupts being provided to the controller 102 in the previously described manner. Upon receiving a read or write command from the host 104, the controller 102 then determines the new desired location on the disk 70 using stored information and then calculates the seek length that will result in the transducer 36 being positioned adjacent the new desired location. It will be understood that the seek length is determined in a known manner such that current can then be applied to the coil 44 in the manner described in reference to FIG. 2.

Once the controller 102 determines the seek length in state 204, the controller 102 then obtains, in state 206, the thermally characterized value corresponding to the seek length determined in state 204. In one implementation, the thermally characterized value corresponding to the seek length is located in the look-up table 112 in the memory 106. Being able to access the thermally characterized value out of a look-up table allows for access to a thermally characterized value which corresponds to a particular seek length in a quick and efficient fashion. It will be appreciated, however, that any of a number of ways of obtaining the thermally characterized value can be implemented without departing from the spirit of the present invention.

Once the thermally characterized value is obtained in state 206, the controller 102 then adjusts, in state 210, the value in the register 110 by the thermally characterized value determined in state 206. As discussed above, the value in the register 110 is a running total of a value that corresponds to the amount of heat energy that has been added to the coil 44 less the amount of heat energy that is being continuously dissipated from the coil 44. By adding the thermally characterized value determined in state 206 to the register 110 in state 210, the resulting value in the register 110 will thus correspond to the heat energy that will be resident in the coil at the conclusion of the seek operation detected in decision state 202. Consequently, the controller 102 can then determine, in decision state 212, whether the adjusted value in the register 110 is within a desired range. In one implementation, the determination by the controller 102 is whether the value adjusted in state 210 is less than a preselected threshold.

If the value in the register 110 is within the desired range, the controller then initiates the seek operation in state 216 in a normal manner. As is understood, the profile of the particular seek operation is predetermined based upon the programming of the controller 102. Preferably, the normal seek operation corresponds to the most efficient manner in which the actuator arm 42 can be moved from its present orientation to the desired orientation so as to increase the throughput of either reading data from or writing data to the disk 70.

Figure 6:
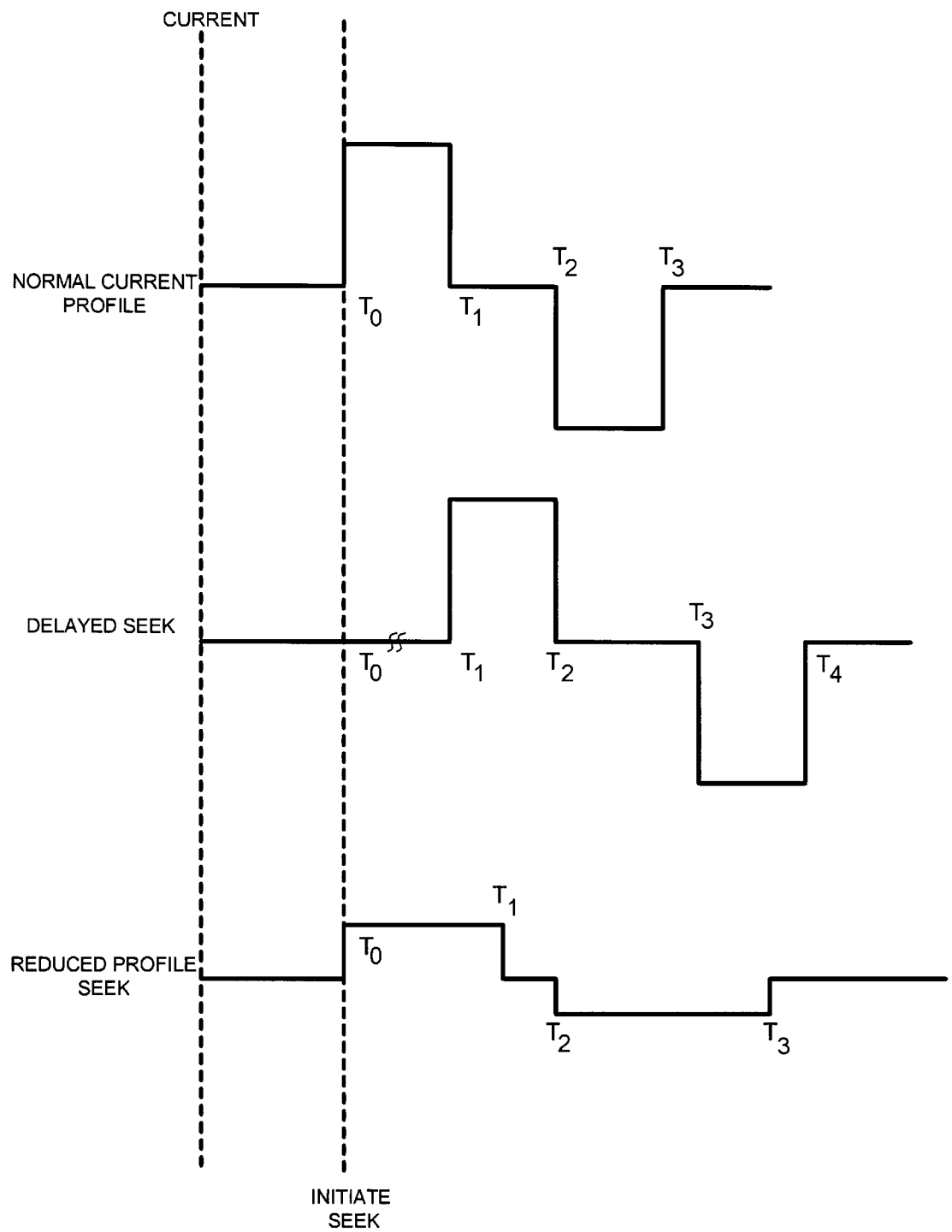
FIG. 6 is a diagram illustrating a typical current consumption curve of a voice coil motor as it performs a normal seek operation and typical current consumption curves of the voice coil motor as it performs adjusted seek operations.

As is understood, the most efficient seek operation can have the normal current profile of FIG. 6 where a maximum amount of positive current is provided to the coil 44 for a pre-selected period of time ($T_0$ to $T_1$) such that the actuator arm 42 reaches a maximum velocity. The current to the coil 44 is then disabled during the dwell time period ($T_1$ to $T_2$) allowing the actuator arm 42 to coast towards the new orientation. Subsequently a maximum negative current is applied to the coil 44 during a de-acceleration period ($T_2$ to $T_3$) to decelerate the actuator arm 42 to the desired orientation with respect to the disk 70. In order to achieve optimum throughput, the normal seek profile applies large amounts of acceleration and deceleration currents to the coil 44 to as to preferably change the orientation of the actuator arm 42 in the quickest possible manner.

However, if the controller 102 determines in decision state 212 that the value in the register 110 is not within the desired range, e.g., that it exceeds the threshold value, the controller 102 can then perform an adjusted seek in state 214. The seek operation is preferably adjusted such that the performance of the desired seek operation will not result in the heat within the coil exceeding the threshold value at which damage to the coil 44 may occur.

FIG. 6 illustrates two possible current profiles of seeks that are adjusted so as to reduce the heat energy that is being added to the coil 44. In one implementation, the initiation of the seek is delayed from a time period $T_0$ to $T_1$ so that additional heat energy can be dissipated out of the coil before the start of the seek operation. As discussed above, the register 112 is being continually adjusted downward, based upon the receipt of the servo wedge interrupts by the controller 102, to account for the dissipation of the heat of the coil 44. By delaying the initiation of the current profile from $T_0$ to $T_1$, excess heat energy can be dissipated out of the coil 44, thereby permitting the seek operation to be performed with reduced risk of damage to the coil 44. The duration of the delay period $T_0$ to $T_1$ will vary depending upon the amount of excess heat energy in the coil 44. In one embodiment, performing the adjusted seek operation comprises simply reentering the decision state 212 so as to provide additional time for the coil to cool down.

Alternatively, instead of delaying the implementation of the seek operation, the controller 102 can initiate the seek operation at the time $T_0$ but alter the seek profile so as to provide reduced heat energy to the coil 44. In the illustrated example of FIG. 6, the magnitude of the current supplied to the coil 44 to accelerate the actuator arm 42 during the time period $T_0$ to $T_1$ and the magnitude of the current supplied to the coil 44 to decelerate the actuator 42 during the time period $T_2$ to $T_3$ is reduced thereby reducing the amount of heat energy added to the coil 44. As a result of the reduction of the acceleration current, the actuator arm 42 accelerates less slowly and requires a longer deceleration period thereby reducing the dwell period $T_2$ to $T_3$. Hence, the seek is performed in a manner that provides less heat energy to the coil 44, but the time period to implement the seek is also lengthened. The amount of reduced current supplied in the implementation can vary depending upon the amount of excess heat energy in the coil 44.

As is also illustrated in FIG. 5, the controller is also continuously receiving servo wedge interrupts from the transducer 36. In general, the controller 102 is performing an interrupt service routine 250 in response to the servo wedge interrupts to maintain the transducer 36 in a desired orientation with respect to the disk 70 during track following and to track the progression of the transducer 36 during a seek operation from one orientation of the actuator arm 42 to another. Hence, the controller 102 is continuously initiating a servo function as a result of receiving these interrupts.

As is further illustrated in FIG. 5, in a preferred embodiment, the servo interrupt routine 250 is modified such that when the interrupt is received in state 252, the controller 102 reduces the value in the register 110 in a state 254 by an amount that corresponds to the amount of heat that would be dissipated during the time period between successive servo interrupts. The controller 102 would then further perform the known servo function in state 256 to facilitate track following or seek operations in the known manner. Once this function is completed, the interrupt routine is completed in state 260 and the controller 102 returns to the existing seek and/or track following process.

Hence, the controller 102 is adapted to continuously decrement the value in the register 110 by an amount that corresponds to the dissipation of heat during all track following and seek operations being performed by the hard disk 30. Thus, the value in the register 110 is being continuously adjusted to accommodate for the dissipation of heat out of the coil 44 such that when the controller 102 is determining in decision state 212 whether the value in the register 112 is within the desired range, it is determining this based upon the sum of the thermally characterized values corresponding to the heat energy being added by successive seek operations to the coil 44 less values indicative of the heat energy that is being continuously dissipated out of the coil 44 over time. Advantageously, the process by which the register 110 is adjusted to account for the dissipation of heat can be accomplished with very little of the bandwidth of the controller 102 as it simply requires the addition of a single command to decrement the register 110 as a result of each servo interrupt.

In one embodiment, the controller 102 reduces the value in the register 110 using a second interrupt routine that is independent of the typical servo interrupt routine. For example, the second interrupt routine could be executed in response to a clock-generated interrupt that is different from the servo interrupts. More particularly, a known clock generator providing a substantially periodic output signal could be used to initiate the clock-generated interrupts and the second routine could reduce the value stored in the register 110 without performing the servo function.

In one embodiment, the running total stored in the register of the control system is an approximate amount of time that is required for the coil to cool to an ambient temperature. Preferably, a time scale is used such that the time between servo wedge interrupts equals one unit of time. Thus, the interrupt routine is able to reduce the value in the register in an efficient manner simply by decrementing the register by a value of one. Furthermore, because heat does not dissipate away from the coil when the temperature of the coil equals the ambient temperature, the value in the register is only decremented if the value stored in the register is greater than zero.

Figure 7:
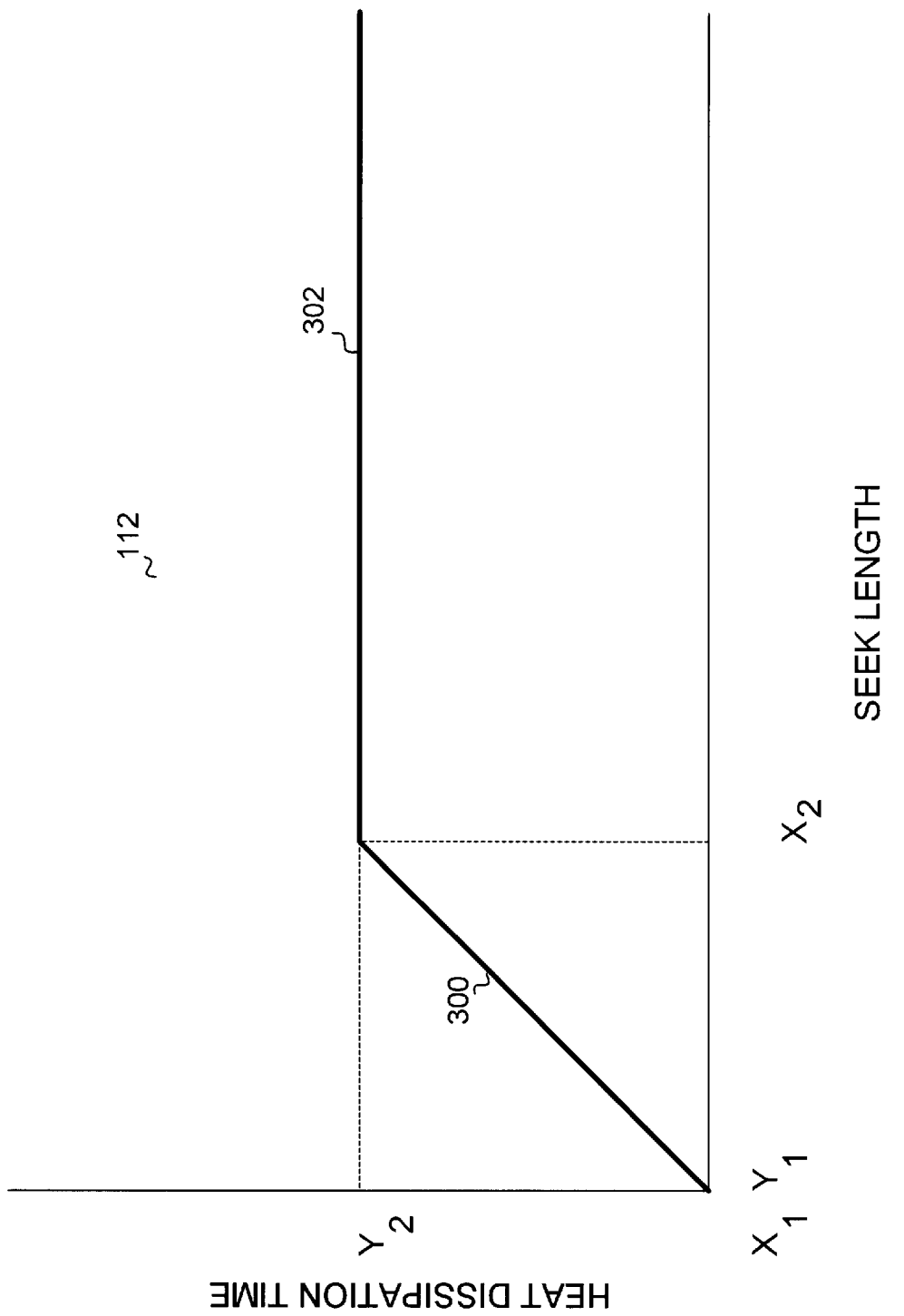
FIG. 7 is a schematic illustration illustrating the contents of a look-up table which includes heat dissipation times plotted versus seek length.

Reference will now be made to FIG. 7 which illustrates one exemplary embodiment of the lookup table 112 described above in connection with FIG. 4 and FIG. 5. The lookup table 112 defines a function y(x) that provides an output value of y which depends on an input value of x. The input value is the seek length of a seek operation and the output value is an estimate of the amount of time that is required for the heat added to the coil during the seek operation to dissipate away from the coil 44. The lookup table 112 is stored in the memory 106 of the control system 52 such that x is an offset to a memory address and y is a value stored in the corresponding memory location. Thus, the controller 102 is able to obtain the estimate of the heat dissipation duration in a relatively small number of processing instructions.

For seek operations having a relatively short seek length, the actuator arm 42 does not reach the maximum allowed speed. Consequently, such seek operations do not include a coast phase between the acceleration and deceleration phases. Because current is always driven through the coil 44 in this circumstance, the heat generated in the coil 44 increases with an increase in the seek length. Thus, the function y(x) comprises a first positively sloped segment 300 that begins at a first point (x1,y1) and continues to a second point (x2,y2) as shown in FIG. 7. Preferably, the first segment has a linear shape and the first point (x1,y1) is equal to (0,0). Furthermore, the second point (x2,y2) corresponds to the situation that the actuator arm 42 reaches the maximum allowed speed for only a substantially brief period of time before being decelerated to rest.

For seek operations having seek lengths larger than x2, the actuator arm 42 reaches the maximum allowed speed and coasts for a period of time between the acceleration and deceleration phases. Because the coil 44 does not receive current during the coast phase, the heat generated in the coil is substantially independent of the seek length. Thus, the function y(x) further comprises a second segment 302 that extends from the second point with a slope equal to zero such that y(x>x2)=y2. Furthermore, because the seek operation having the seek length equal to x2 provides the maximum heat dissipation duration y2 in the shortest period of time, the seek operation corresponding to the second point (x2,y2) of the lookup table 112 is referred to hereinbelow as the maximally heating seek operation.

Figure 8:
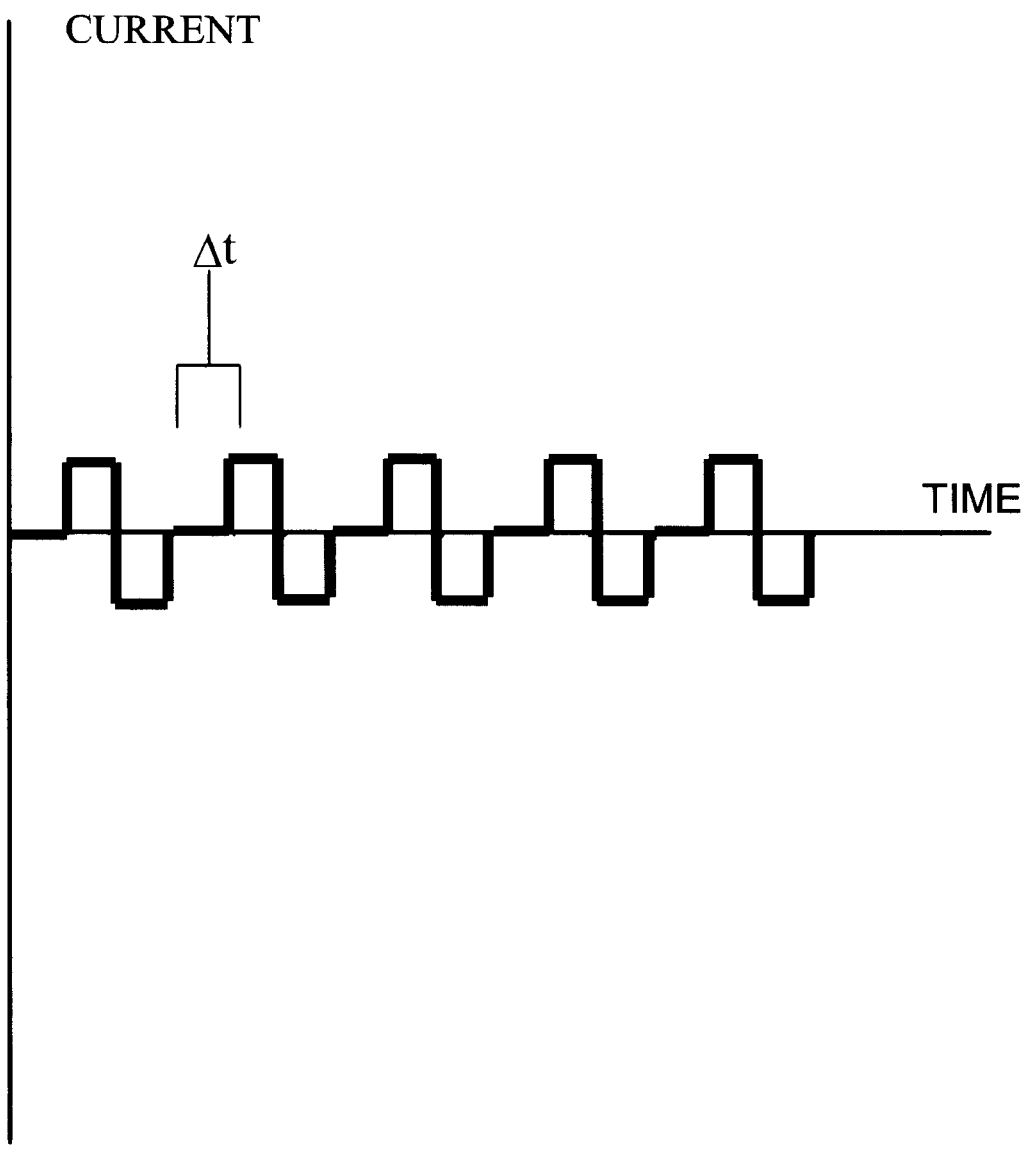
FIG. 8 is a schematic illustration of a typical current profile used to determine the values of the look up table of FIG. 7.

In one embodiment, the values of x2 and y2 are determined during the operation of a test hard disk drive which is substantially identical to the drive of FIG. 1. In particular, x2 is obtained from the measured displacement of the transducer 36 during the maximally heating seek operation. Furthermore, the test drive is directed to repeatedly undergo maximally heating seek operations such that a time delay, $\Delta t$, is introduced between seek operations as shown in the coil current profile of FIG. 8. The time delay is adjusted until the temperature of the coil is maintained at a constant elevated value. Because the coil is in a state of thermal equilibrium, the heat dissipation time corresponding to a single maximally heating seek operation is equal to the time between the start of two successive maximally heating seek operations. Thus, the value of y2 can be obtained from the sum of the time required to undergo a single maximally heating seek operation plus the finally adjusted value of Δt.

In one embodiment, the threshold value described above in connection with FIG. 4 and FIG. 5 is determined by operating the test drive in a maximally heating manner. In particular, the test drive is directed to repeatedly undergo the maximally heating seek operations such that no delay is introduced between successive seek operations, thereby raising the temperature of the test drive at a maximum rate. Meanwhile, the test drive accumulates the thermally characterized values in the register as mentioned above. At the instant when the temperature of the coil reaches a threshold temperature, the value accumulated in the register of the test drive is recorded and assigned to the threshold value.

Although the preferred embodiment of the present invention has shown, described and pointed out the fundamental novel features of the invention as applied to this embodiment, it will be understood that various omissions, substitutions and changes in the form of the detail of the device illustrated may be made by those skilled in the art without departing from the spirit of the present invention. Consequently, the scope of the invention should not be limited to the foregoing description, but should be defined by the appending claims.

What is claimed is:

1. A method of inhibiting a voice coil of a hard disk drive from overheating, the method comprising:
    performing a plurality of seek operations;
    adjusting a value stored in a register by amounts which are indicative of the heat which is produced in the voice coil during the plurality of seek operations;
    continually counter-adjusting the adjusted value stored in the register while the plurality of the seek operations are performed, wherein the counter-adjusting occurring at a rate which is determined by a substantially periodic signal; and
    modifying seek operations when the value of the register is outside of a preferred range.

2. The method of claim 1, wherein adjusting a value stored in a register comprises increasing the value stored in the register.

3. The method of claim 2, wherein counter-adjusting the value stored in the register comprises decreasing the value stored in the register.

4. The method of claim 1, wherein counter-adjusting the value stored in the register comprises counter-adjusting the value stored in the register at a rate which is determined by the rotational speed of a disk of the drive.

5. The method of claim 1, wherein said substantially periodic signal comprises a plurality of interrupts.

6. The method of claim 5, wherein said plurality of interrupts are generated in response to an input clock signal.

7. The method of claim 5, wherein said plurality of interrupts are generated in response to a transducer of the drive passing a plurality of servo wedges of a disk of the drive.

8. The method of claim 5, wherein said periodic signal has a period which is determined by the rotational speed of a disk of the drive.

9. The method of claim 8, wherein the period of the periodic signal is substantially equal to an amount of time that is required for first and second servo wedges of a disk of the drive to pass by a transducer of the drive.

10. The method of claim 1, wherein counter-adjusting the value comprises decreasing the value stored in the register in response to a servo wedge of the disk passing a transducer of the drive.

11. The method of claim 1, wherein adjusting a value stored in a register by amounts which are indicative of the heat which is produced in the voice coil during the plurality of seek operations comprises increasing the value of the register by amounts which are determined by the seek lengths of the plurality of seek operations.

12. The method of claim 1, wherein adjusting a value stored in a register by amounts which are indicative of the heat which is produced in the voice coil during the plurality of seek operations comprises accumulating estimated heat dissipation time periods in the register.

13. The method of claim 1, wherein counter-adjusting the value comprises counter-adjusting the value during said plurality of seek operations.

14. The method of claim 1, wherein counter-adjusting the value comprises counter-adjusting the value during a track following operation.

15. The method of claim 1, wherein modifying seek operations comprises delaying subsequent seek operations.

16. The method of claim 15, wherein delaying subsequent seek operations comprises delaying subsequent seek operations until the value of the register is within the preferred range.

17. The method of claim 15, wherein delaying subsequent seek operations comprises delaying subsequent seek operations for a fixed period of time.

18. The method of claim 1, wherein modifying seek operations comprises providing the coil with a reduced average current.

19. The method of claim 1, wherein modifying seek operations when the value of the register is outside of a preferred range comprises modifying seek operations when the value of the register is greater than a threshold value.

20. The method of claim 19, wherein modifying seek operations when the value of the register is greater than a threshold value comprises modifying seek operations when the value of the register is greater than the threshold value which is determined by (a) performing a plurality of maximally heating seek operations on a substantially identical hard drive, and (b) extracting the value of the register of the substantially identical hard drive when the temperature of the coil of the substantially identical hard drive reaches a threshold temperature.

21. A method of inhibiting a voice coil of a hard disk drive from overheating, the method comprising:
    performing a plurality of seek operations so as to reposition a transducer adjacent a recording medium a plurality of times, wherein each seek operation adds heat to the coil;
    determining a plurality of thermally characterized values, wherein each thermally characterized value is indicative of the heat that is added to the coil during a corresponding seek operation of the plurality of seek operations;
    accumulating the plurality of thermally characterized values in a register;
    continually reducing the value stored in the register while the plurality of the seek operations are performed; and
    modifying seek operations when the value of the register is greater than a threshold value.

22. The method of claim 21, wherein each of the plurality of thermally characterized values is an estimate of a time period that is required for the heat added to the coil during the corresponding seek operation to dissipate away from the coil.

23. The method of claim 21, wherein determining a plurality of thermally characterized values comprises using a lookup table.

24. The method of claim 23, wherein using a lookup table comprises using an x-y lookup table that correlates an estimated heat dissipation duration (y) to a seek length (x).

25. The method of claim 24, further comprising initializing the lookup table so as to define (a) a positively sloped line that begins at a first point (x1,y1) and extends to a second point (x2,y2), and (b) a horizontal line that extends from the second point.

26. The method of claim 25, further comprising equating x2 with a seek length of a maximally heating seek operation such that the transducer is substantially always accelerating or decelerating and the transducer reaches a maximally allowed speed during the maximally heating seek operation.

27. The method of claim 25, further comprising determining y2 by performing a plurality of maximally heating seek operations on a substantially identical hard disk drive such that a delay period, $\Delta t$, is introduced between successive seek operations so as to maintain the temperature of the substantially identical hard drive at a constant elevated value.

28. The method of claim 27, wherein determining y2 further comprises equating y2 to the time duration of a maximally heating seek operation plus $\Delta t$.

29. The method of claim 21, wherein accumulating the plurality of thermally characterized values in a register comprises adding the plurality of thermally characterized values to the register.

30. The method of claim 29, wherein adding the plurality of thermally characterized values to the register comprises adding the plurality of thermally characterized values so as to be synchronous with said performing a plurality of seek operations.

31. The method of claim 21, wherein continually reducing the register comprises periodically reducing the value stored in the register at a substantially constant rate.

32. The method of claim 21, wherein continually reducing the register comprises periodically subtracting a plurality of elapsed times from the register.

33. The method of claim 32, wherein each of the plurality of elapsed times is the time required for adjacent servo wedges of the recording medium to pass by the transducer.

34. The method of claim 21, wherein continually reducing the register further comprises responding to a plurality of interrupts.

35. A hard disk drive comprising:
a magnetic medium;
a transducer that interacts with the magnetic medium;
an actuator comprising a voice coil that accelerates the transducer; and
a control system comprising a register, wherein the control system instructs the actuator to perform a plurality of seek operations so as to reposition the transducer between a plurality of locations adjacent the magnetic medium, wherein the register stores a value which is indicative of the thermal energy of the coil, wherein the control system adjusts the value of the register according to the plurality of seek operations so as to account for heat added to the coil during the plurality of seek operations, wherein the control system continually counter-adjusts the adjusted value of the register while the plurality of the seek operations are performed to account for heat that dissipates away from the coil, and wherein the control system modifies subsequent seek operations when the value stored in the register is outside of a preferred range so as to reduce the rate at which heat is added to the coil.

36. The drive of claim 35, wherein the value stored in the register is an estimated amount of time that is required for the coil to cool down to a preferred temperature.

37. The drive of claim 35, wherein the control system adjusts the value stored in the register by increasing the value stored in the register in correspondence with each of the plurality of seek operations, wherein each increase adds a period of time which is an estimate of the time that is required for the heat added during the corresponding seek operation to dissipate away from the coil.

38. The drive of claim 37, wherein the control system counter-adjusts the value stored in the register by periodically reducing the value stored in the register so as to account for the passing of time.

39. The drive of claim 35, wherein the magnetic medium comprises a plurality of servo wedges that provide the control system with a substantially periodic signal, wherein the control system counter-adjusts the value stored in the register according to the substantially periodic signal.

40. The drive of claim 35, wherein the control system modifies subsequent seek operations by delaying subsequent seek operations.

41. The drive of claim 35, wherein the voice coil accelerates the transducer when a current flows through the voice coil and wherein the control system modifies subsequent seek operations by reducing the current that flows through the voice coil.

42. The drive of claim 35, wherein the control system further comprises a memory that stores a lookup table which correlates a heat dissipation time period (y) to a seek length (y).

43. The drive of claim 35, wherein the lookup table is defined by (a) a positively sloped line that begins at a first point (x1,y1) and extends to a second point (x2,y2), and (b) a horizontal line that extends from the second point.

44. The drive of claim 43, wherein x2 is substantially equal to the seek length of a maximally heating seek operation such that the transducer is substantially always accelerating or decelerating and the transducer reaches a maximally allowed speed during the maximally heating seek operation.

45. The drive of claim 44, wherein y2 is substantially equal to the time duration of a maximally heating seek operation plus a delay period, $\Delta t$, which is determined by performing a plurality of maximally heating seek operations on a substantially identical hard disk drive such that the delay period, $\Delta t$, is introduced between successive maximally heating seek operations so as to maintain the temperature of the substantially identical hard drive at a constant elevated value.

46. The drive of claim 35, wherein the control system modifies subsequent seek operations when the value stored in the register is greater than a threshold value.

47. The drive of claim 46, wherein the threshold value is determined by (a) performing a plurality of maximally heating seek operations on a substantially identical hard drive, and (b) extracting the value of the register of the substantially identical hard drive when the temperature of the coil of the substantially identical hard drive reaches a threshold temperature.

* * * * *